(12) United States Patent
Sauvant (10) Patent No.: US 11,868,822 B2
(45) Date of Patent: Jan. 9, 2024

(54) MANAGING ACCESS TO A RESOURCE SHARED BY A PLURALITY OF APPLICATIONS

(71) Applicant: Airbus Operations SAS, Toulouse (FR)

(72) Inventor: Sylvain Sauvant, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 304 days.

(21) Appl. No.: 17/111,176

(22) Filed: Dec. 3, 2020

(65) Prior Publication Data
US 2021/0173721 A1 Jun. 10, 2021

(30) Foreign Application Priority Data

Dec. 5, 2019 (FR) ...................... 1913808

(51) Int. Cl.
*G06F 9/50* (2006.01)
*G06F 9/52* (2006.01)
*G06F 9/54* (2006.01)

(52) U.S. Cl.
CPC ............ *G06F 9/526* (2013.01); *G06F 9/5016* (2013.01); *G06F 9/544* (2013.01)

(58) Field of Classification Search
CPC ......... G06F 9/526; G06F 9/5016; G06F 9/544
See application file for complete search history.

(56) References Cited

U.S. PATENT DOCUMENTS 6,601,083 B1 * 7/2003 Reznak ................. G06F 9/5016
710/240
9,327,600 B1 * 5/2016 Nehmeh ................. B60L 1/00
10,430,799 B1 * 10/2019 Kapoor ................. G06Q 30/01
2005/0004879 A1 * 1/2005 Mathias ............ G06Q 30/0283
714/E11.2
2011/0202931 A1 8/2011 Dessertenne et al.

FOREIGN PATENT DOCUMENTS

FR 2829848 A1 3/2003
FR 2956226 A1 8/2011
WO 2017180032 A1 10/2017

OTHER PUBLICATIONS

French Search Report; priority document.

* cited by examiner

*Primary Examiner* — Emerson C Puente
*Assistant Examiner* — Jonathan R Labud
(74) *Attorney, Agent, or Firm* — Greer, Burns & Crain, Ltd.

(57) ABSTRACT

A method for managing access to a shared resource in an electronic system including a control unit and the shared resource. The control unit is intended to execute applications that are candidates for access to the shared resource. The method uses a calendar of periods of equal duration, each assigned to just one of the applications, to define a temporal distribution of access to the shared resource, and penalty indices associated with each of the applications. The method includes steps for conditionally processing the access requests transmitted by the applications according to their penalty indices. Thus, each application is prevented from accessing the shared resource when the quota assigned thereto is reached, which makes it possible to limit the encroachment of an application that is executed on the access quotas for accessing the resource that are assigned to the other applications.

11 Claims, 8 Drawing Sheets

MANAGING ACCESS TO A RESOURCE SHARED BY A PLURALITY OF APPLICATIONS

CROSS-REFERENCES TO RELATED APPLICATIONS

This application claims the benefit of the French patent application No. 1913808 filed on Dec. 5, 2019, the entire disclosures of which are incorporated herein by way of reference.

FIELD OF THE INVENTION

The present invention relates to managing access to a resource shared by a plurality of applications. The present invention applies more particularly to the field of avionics, in the context of accessing a shared resource such as a non-volatile memory, in an avionics system exhibiting substantial time constraints.

BACKGROUND OF THE INVENTION

Autonomous electronic and computer systems, also commonly called onboard systems, are designed to perform precise tasks. They should be capable of interacting with their environment (sensors, actuators, etc.) and of managing the resources available for this purpose (computing devices, energy, data storage, etc.). Such onboard systems are widely used in transport, including air transport. The interactions between the hardware and software components are very rigorously defined in avionics, such that the time constraints inherent to a given system (called "real-time" constraints) are observed and that various elements of the system are able to perform their respective functions in parallel.

Onboard avionics systems use architectures in which a software application may be broken down into a plurality of applications, or into a plurality of software partitions, executed in parallel by one or more platforms. What is understood here by "platform" is a set of resources configured for the execution of software applications. A platform comprises, for example, one or more data processing units, volatile and non-volatile memories, input and output interfaces, one or more controllers controlling access to shared resources, one or more interfaces for connection to networks, and clock systems.

Such a software breakdown is implemented in IMA (integrated modular avionics) architecture contexts. When a plurality of applications or application partitions share one and the same resource, it is appropriate to assign periods of execution time and typically one or more memory spaces to each application or to each application partition (in the case where the application in question is broken down into a plurality of partitions). In the field of avionics, each application implements an avionics function. For more detail on the temporal and spatial partitioning of processing resources (such as the sharing of resources), reference may be made to the ARINC 653 standard.

It is thus apparent that resources, such as memory resources, are temporally shared by applications or application partitions according to independent timings. As a result of this approach, a plurality of applications or application partitions may come into competition to access a shared resource, such as a non-volatile memory.

In particular, avionics platforms provide different non-volatile memory technologies affording different characteristics and properties. Thus, some technologies afford substantially identical read and write access times, while other technologies exhibit substantial asymmetry between these two types of operations. Additionally, an erase operation may require a much longer time than a read or write operation, and the ratio of the execution times required to accomplish this other type of operation may be higher than 1000, for example.

Substantial access times to a shared resource, such as a memory resource, in relation to a unit of temporal allocation and/or the periodicity of activation of an application, are such that one or more applications, or application partitions, may thus be stalled due to saturation of access to this shared resource. This situation corresponds to a conflict of access to the shared resource, which leads to highly variable execution times for the applications or application partitions (slowing down of the stalled applications). Such a situation may, in particular, present a problem of loss of segregation between the applications by denial of service due to unfair application behavior, referred to as "untrustworthy" behavior, regarding access to a shared resource, such as a non-volatile memory. Segregation between applications is additionally a property required for incremental certification in the field of avionics. Incremental certification allows a substantial decrease in integration costs when one or more applications have to be added or modified. However, a segregation failure between applications decreases the possibilities for optimizing the avionics in terms of cost, of volume, of weight, of power consumption and of reliability.

SUMMARY OF THE INVENTION

An aim of the invention is to guarantee a time quota for access with respect to each of the applications of a system that has to be able to access one and the same shared resource.

To this end, one subject of the invention is a method for managing access to a shared resource in an electronic system, the accesses being made by concurrent applications executed by the electronic system, the method using a calendar of periods of equal duration, each of the periods being assigned to just one of the applications so as to define a sequencing of the accesses and to assign, to each of the applications, an access quota for accessing the shared resource, the method comprising steps for:

applying a penalty to any application from among the applications whose time accessing the shared resource exceeds, for at least one calendar period assigned to the application, the quota assigned to the application, the penalty being dependent on a duration by which a predefined unit time is exceeded, and conditionally processing requests to access the shared resource such that, when a first application may access the shared resource according to the sequence defined by the calendar, ignoring an access request transmitted by the first application if a penalty applied to the first application has not been cleared and considering authorizing access to the shared resource for a second application which follows the first application in the sequence, according to the calendar, and otherwise processing a potential pending access request for the first application if the penalty is not present or has been cleared.

Thus, each application is prevented from accessing the shared resource when the quota assigned thereto has been reached. This then makes it possible to limit the encroachment of the application that is executed on the access quotas for accessing the shared resource that are assigned to the other applications. Segregation between applications is thus ensured, which makes incremental certification of the applications possible.

According to one embodiment of the invention, the method is implemented in the form of a list of identifiers of the applications, called candidate applications, the steps of applying a penalty and of conditionally processing the accesses comprising steps for repeatedly reading the list of identifiers of the candidate applications and, for each of the reads of an identifier of the list:

i) reading the penalty index associated with the candidate application and decrementing the associated penalty index, without processing the access request, when the penalty index read is higher than a predetermined threshold, ii) when the penalty index read is lower than or equal to the predetermined threshold, determining the presence of a potential request to access the shared resource by the candidate application corresponding to the identifier read, iii) in the presence of an access request, processing the access request and then potentially incrementing the penalty associated with the candidate application, by a coefficient indexed over a time accessing the shared resource to process the access request, and iv) waiting until a wait equal to the duration of the periods from the last read of an identifier of the list has elapsed.

According to one embodiment of the invention, the shared resource is a non-volatile memory.

Advantageously, each of the access requests relates to a type of access request from among two predefined types, which are read and write.

According to one embodiment of the invention, each of the access requests relates to a type of access request from among three predefined types, which are read, write and erase.

Advantageously, the coefficient used to increment the penalty index is a value predefined according to the type of the access request (read, write or erase).

According to one embodiment of the invention, the coefficient used to increment the penalty index is a value corresponding to an access time measured during the processing of the request to access the shared resource.

Another subject of the invention is an access manager device for managing access to a shared resource in an electronic system, the accesses being made by concurrent applications executed by the electronic system, the device implementing a calendar of periods of equal duration, each of the periods being assigned to just one of the applications so as to define a sequencing of the accesses and to assign, to each of the applications, an access quota for accessing the shared resource, the device comprising electronic circuitry configured for:

applying a penalty to any application from among the applications whose time accessing the shared resource exceeds, for at least one calendar period assigned to the application, the quota assigned to the application, the penalty being dependent on a duration by which a predefined unit time is exceeded, and conditionally processing requests to access the shared resource such that, when a first application may access the shared resource according to the sequence defined by the calendar, ignoring an access request transmitted by the first application if a penalty applied to the first application has not been cleared and considering authorizing access to the shared resource for a second application which follows the first application in the sequence, according to the calendar, and otherwise processing a potential pending access request for the first application if the penalty is not present or has been cleared.

Another subject of the invention is an electronic system comprising a shared resource and an access manager device for managing access to the shared resource such as presented above.

The invention further relates to an electronic system such as presented above and configured to implement avionics functions in which accesses to at least one shared resource are managed by the access manager for managing access to the shared resource described above.

Lastly, another subject of the invention is an aircraft comprising at least one electronic system such as described above.

BRIEF DESCRIPTION OF THE DRAWINGS

The features of the invention mentioned above, along with others, will become more clearly apparent on reading the following description of at least one exemplary embodiment, the description being given with reference to the appended drawings, in which.

DETAILED DESCRIPTION OF THE PREFERRED EMBODIMENTS

Figure 1A:
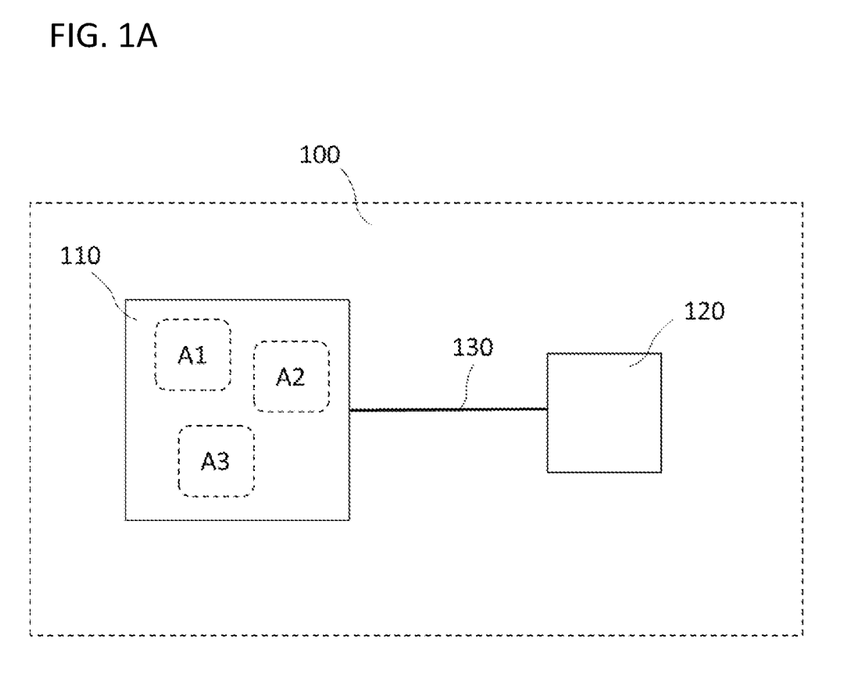
FIG. 1A schematically illustrates an electronic system comprising a control unit and a shared resource and implementing a method for managing access to the shared resource according to one particular and non-limiting embodiment of the invention.

FIG. 1A schematically illustrates an electronic system 100 comprising a control unit 110 and a shared resource 120 accessible from the control unit 110 through a connection bus 130. In the following description, it is assumed that the shared resource is a memory, and more particularly a non-volatile memory, and it is described as such. Of course, the chosen example is non-limiting and the shared resource may be of another type, such as an actuator, a sensor, or a computing device, for example.

The non-volatile memory 120 uses NOR-type flash technology (which technology is based on a NOR-type elementary structure, as opposed to NAND-type flash memory technology). According to some variants, the non-volatile memory 120 uses nvSRAM ("non-volatile static random-access memory"), MRAM ("magnetic random-access memory"), FRAM ("ferroelectric random-access memory") or eMMC ("embedded multimedia card") technology.

The control unit 110 is intended to parallel-execute applications or application partitions A1, A2, A3 and A4 whose respective executable codes are stored in a non-volatile memory 113 (visible in FIG. 1B) of the electronic system 100 before execution. Throughout the remainder of the description, the term "application" will refer equally to an application or to an application partition.

The control unit 110 comprises a microprocessor, a non-volatile memory module for storing executable code and data, a random-access memory module for the execution of the executable code and storing variable- or stack-type data, and a set of connected circuits required for the operation of its digital core including a power-supply interface, input-output ports, switch ports, clock circuits, one or more reset circuits, and power-supply monitoring circuits, this list being non-exhaustive. FIG. 1A shows a case where the applications A1, A2 and A3 are executed in parallel by the control unit 110. In other words, the applications A1, A2 and A3 are concurrent in the electronic system 100. The concurrent execution of the applications A1, A2, A3 is such that the applications A1, A2 and A3 share the non-volatile memory 120 and, consequently, the connection bus 130 to the non-volatile memory 120. The accesses executed in the non-volatile memory 120, by the applications A1, A2, and A3, are of different types (for example read, write and erase). Each type of access requires a specific time for its execution. According to the invention, an access of a given type requires generation of an access request of a corresponding type. It is thus possible to identify each of the types of access to the memory by means of a type identifier. Thus, a read access to the non-volatile memory 120 is defined as a type 0 access, a write access to the non-volatile memory 120 is defined as a type 1 access and an erase access to this same memory is defined as a type 2 access. When one of the applications A1, A2 or A3 performs access of any of the aforementioned types to the non-volatile memory 120, the other applications cannot have access thereto, which may be detrimental to the satisfactory execution of the tasks performed, respectively, by these other applications if the period of inaccessibility of the non-volatile memory 120 lasts for a long time.

One particularity of non-volatile memories is that there is a substantial disparity in terms of execution time between accesses of different types. This disparity is also encountered with respect to other types of shared resources. Thus, a write (or type 1) operation in a cell of the memory 120 takes a longer time than a read (or type 0) operation in the memory 120. Analogously, an erase (or type 2) operation on a cell of the non-volatile memory 120 takes a much longer time than a write or read operation in this same memory. Depending on the memory technology used, the ratio of the execution time for a read operation to that for a write operation may vary. Reading is the access that requires the least time. Throughout the remainder of the description and for explanatory purposes, the access times to the non-volatile memory 120 are expressed in multiples of a unit time for accessing the memory. This unit time for accessing the memory is defined such that each of the different types of access has a duration equal to this unit time or to a multiple thereof. In the following example, the unit time is the maximum time required to complete a read operation in the non-volatile memory 120 from the control unit 110, executed by any one of the applications A1, A2, A3. Still according to this example, the maximum time for write access to the non-volatile memory 120 is twice the read access time. The duration of a write access time is therefore equal to two units access time. The time for access to the non-volatile memory 120 required to erase a cell of the memory is, still according to the described example, 4404 times the read time, i.e., equal to 4404 units time.

As described below, the management of access to a resource shared by a plurality of applications, according to the invention, allows time windows to be assigned to each application by virtue of the judicious use of a calendar. This makes it possible to assign, to each of the applications A1, A2 and A3, executed in parallel, a percentage of the bandwidth available for accessing the shared resource (e.g., the non-volatile memory 120 via the bus of connection 130). According to the preferred embodiment of the invention, the management of the access to the non-volatile memory 120 shared between the applications A1, A2 and A3 is performed by an access manager device, integrated into the control unit 110.

Figure 1B:
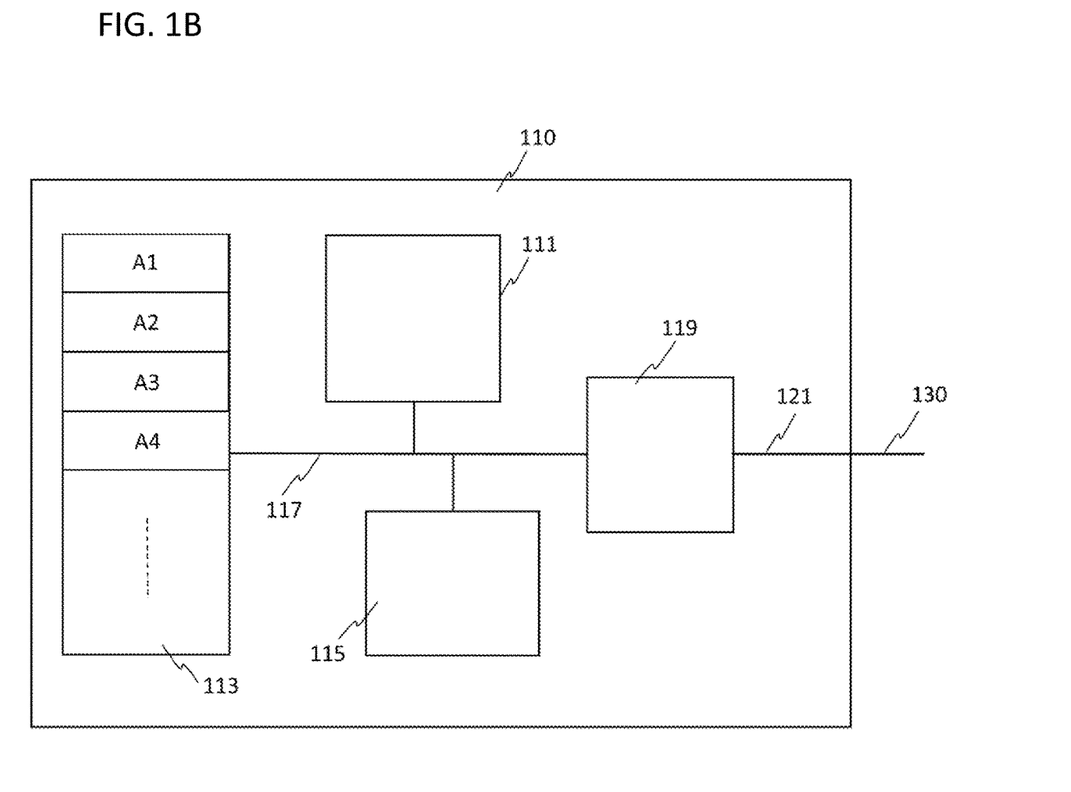
FIG. 1B schematically illustrates the control unit of the system already shown in FIG. 1A comprising an access manager for managing access to a shared resource according to one particular and non-limiting embodiment of the invention.

FIG. 1B schematically shows the control unit 110 already shown in FIG. 1A. The control unit 110 comprises a microprocessor 111, a non-volatile memory module 113 comprising regions dedicated to the storage of the executable codes corresponding to the applications A1, A2, A3, A4, and a random-access memory module 115. According to the example that will be described, the application A4, although available in the non-volatile memory 113 of the electronic system 100, is not executed by the control unit 110 and only the applications A1, A2 and A3 are candidates for access to the non-volatile memory 120. The microprocessor 111, the non-volatile memory module 113 and the random-access memory module 115 are connected to one another by an interconnection bus 117. An access manager 119 is connected to the interconnection bus 119 and to a bus 121 for connecting the non-volatile memory 120 to the control unit 110. The bus 130 shown in FIG. 1B is connected to the bus 121 internal to the control unit 110. The access manager for managing access to the non-volatile memory 120 organizes sharing of the non-volatile memory 120 according to a temporal distribution judiciously defined by means of a calendar comprising a predetermined number of periods of equal duration, each assigned to only one of the applications A1, A2, A3 executed in parallel by the control unit 110 and therefore a candidate for access to the non-volatile memory 120. The access manager 119 comprises electronic circuitry, for example an internal microcontroller, a random-access memory module and a set of registers required for the implementation of the method according to the invention, and all of the usual connected elements required for the operation of these elements.

Figure 2:
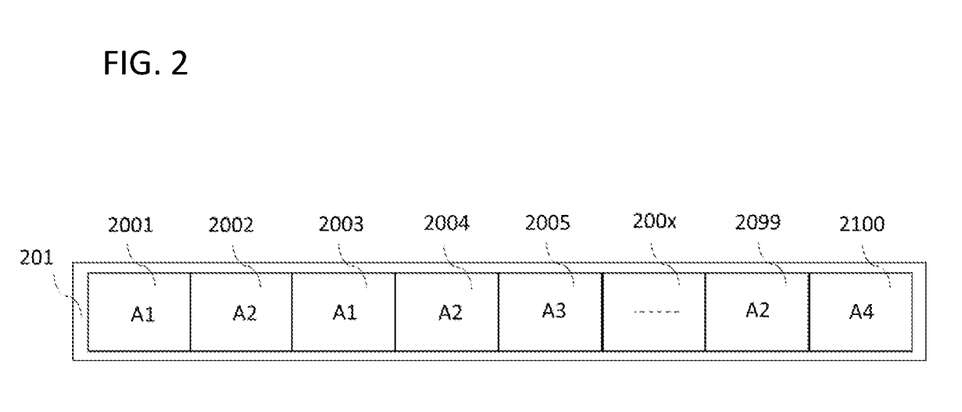
FIG. 2 illustrates a calendar for temporal distribution of the accesses to a resource shared by a plurality of applications such as used by the method for managing the accesses according to the invention.

FIG. 2 shows a calendar 201 comprising 100 periods 2001 to 2100 of equal duration. Each of the periods 2001 to 2100 of the calendar 201 is assigned to one of the candidate applications for access to the non-volatile memory 120. The instancing of the calendar is such that a traversal of the periods according to their incremental numbering (i.e., from the left to the right of in FIG. 2) corresponds to passing time. Judiciously, and according to the invention, each of the periods of the calendar has a theoretical duration corresponding to the unit time mentioned above, i.e., according to the described example, equal to the time for read access to the non-volatile memory 120 from the microprocessor 111 of the control unit 110.

Advantageously, the periods 2001 to 2100 of the calendar 201 are assigned to the applications so as to best distribute the different occurrences of one and the same application within the calendar. Thus, if for example an application has to be able to have access to the shared resource 120 for a third of the time on average, the calendar 201 is configured such that one period out of three is assigned to this application and an identifier of this application is read one period out of three when the calendar is traversed according to its direction of reading.

The assignment of the periods of the calendar to the applications may be defined by programming during the manufacture of the electronic system 100 or during a configuration operation. The configuration of the calendar may be fixed or dynamically modifiable according to parameters such as, for example, the nature of functions executed by the applications in the electronic system 100 and a criticality coefficient assigned to each of these functions.

The method for assigning periods of the calendar would allow a temporal distribution of the accesses to the memory that is distributed according to the number of occurrences of each of the applications in the calendar if all of the accesses to the memory were of equal duration.

However, as mentioned above and according to the described embodiment, the duration of an access to the non-volatile memory 120 differs from one type of access to another. Considering this disparity in access time according to the type of access made (read, write or erase), the actual temporal distribution between the applications A1, A2, A3 might not correspond to that defined by the calendar 201 if each period of the calendar corresponds to one unit time. Thus, if, for example, the application A1 performs a read access in period 2001 of the calendar, and the application A2 initiates a write access in period 2002 of the calendar, the non-volatile memory 120 is made unavailable until the end of period 2003 of the calendar (considering that the write duration is equal to two units time, i.e., two periods of the calendar 201). If the application A1 wishes to initiate any access in period 2003 of the calendar, as the calendar shown envisages, the application A1 is prevented from doing so, since the non-volatile memory 120 is not yet available (due to a write being performed). The temporal distribution according to the calendar 201 is then not observed.

In order to overcome this unfairness, the management of the access to the non-volatile memory 120 according to the invention judiciously assigns a penalty to an application every time this application monopolizes the non-volatile memory 120 for longer than the access time corresponding to the shortest access type, i.e., according to the described example, longer than one unit access time. A penalty coefficient is then assigned to the application, this penalty coefficient being equal to exceedance of the theoretical time assigned by the calendar (i.e., the duration of one period of the calendar or the unit time). According to this principle, a read access does not entail a penalty, a write access entails a penalty with a coefficient equal to 1, and an erase access entails a penalty with a coefficient equal to 4403.

For each of the periods of the calendar, if a candidate application wishes to access the non-volatile memory 120, it may not do so for as long as its penalty is higher than a predetermined threshold (preferably set at 0). When an application is thus denied access to the non-volatile memory 120, no new access is initiated for this application for the corresponding period of the calendar and its penalty index is decremented. The requested access to the memory is not simply just rejected, but stored in a queue for access to the non-volatile memory 120. The period of the calendar is, in this case, granted to another application for which an access is pending processing (due to unavailability of the non-volatile memory 120 already monopolized by an access).

According to one embodiment of the invention, each candidate application A1, A2 or A3 for access to the memory is assigned, by the access manager 119, a circular-type buffer region for the storage of requests to access the non-volatile memory 120 (i.e., for the implementation of its queue for access to the non-volatile memory 120). These circular buffers WFA1, WFA2 and WFA3 are therefore associated, respectively, with the candidate applications A1, A2, A3 for access to the non-volatile memory 120. According to one embodiment of the invention, the circular buffers are implemented in a random-access memory module internal to the access manager 119. Each circular buffer dedicated to one of the applications A1, A2 and A3 (i.e., each list of requests pending processing) is processed by a module for processing the access requests, internal to the access manager 119, according to the principle of FIFO (first in, first out) memory. According to one variant, a single buffer may be used for all of the access requests from all of the candidate applications, this solution being however more complex to implement since it requires a more detailed polling mode for the content of the common circular buffer.

Figure 3:
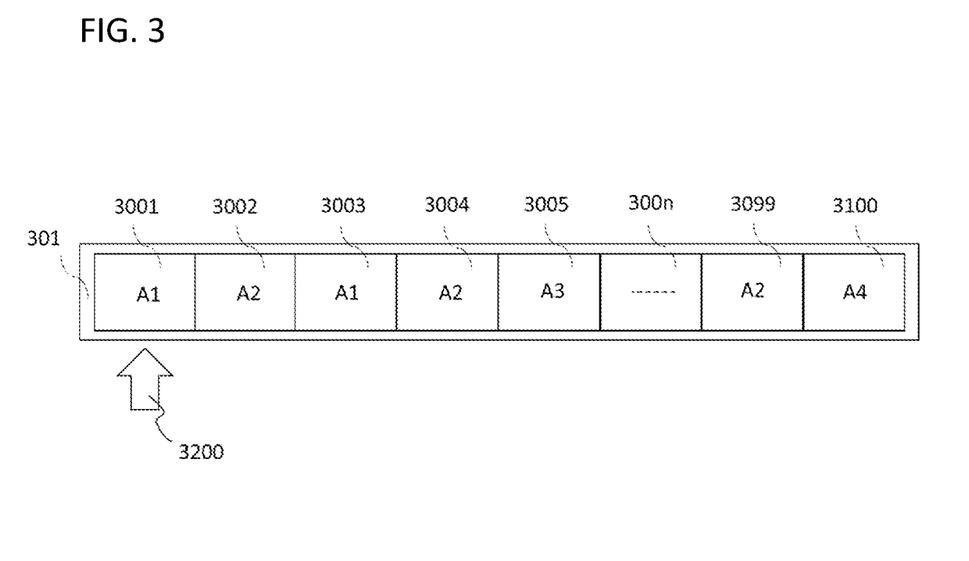
FIG. 3 illustrates a list of application identifiers that is established on the basis of the temporal distribution calendar of distribution shown in FIG. 2.

As described below, the principle of temporal distribution according to the calendar 201 and of the penalty indices associated, respectively, with each of the candidate applications for access to the non-volatile memory 120 is, in one particular embodiment, implemented by virtue of a list 301 of application identifiers and penalty indices, each of these indices being associated with a candidate application for access to the non-volatile memory 120. Penalty indices CPA1, CPA2, CPA3 are therefore associated, respectively, with the applications A1, A2 and A3, and are typically implemented in the form of variables, i.e., of values stored in registers internal to the access manager 119. The values of the penalty indices CPA1, CPA2, CPA3 are incremented or decremented as described below, under control of the access manager 119.

FIG. 3 shows the list 301 of application identifiers that is generated from the calendar 201. The list 301 of application identifiers constitutes an implementation of the calendar 201 and comprises, to this end, a number of identifiers 3001 to 3100 equal to the number of periods 2001 to 2100 of the calendar 201.

Advantageously, when the calendar 201 and the list 301 of application identifiers each comprise 100 elements, it is possible to produce a temporal distribution with a precision of 1%. Of course, the calendar and the list 301 of application identifiers may have a number of elements smaller or greater than 100, but the number of elements of the list 301 of application identifiers is always identical to the number of elements of the calendar (considering that the list 301 of application identifiers contains a single copy of the calendar 201). Thus, if the calendar 201 comprises 200 periods, the temporal distribution of the accesses may be defined with a precision of 0.5%.

Figure 4:
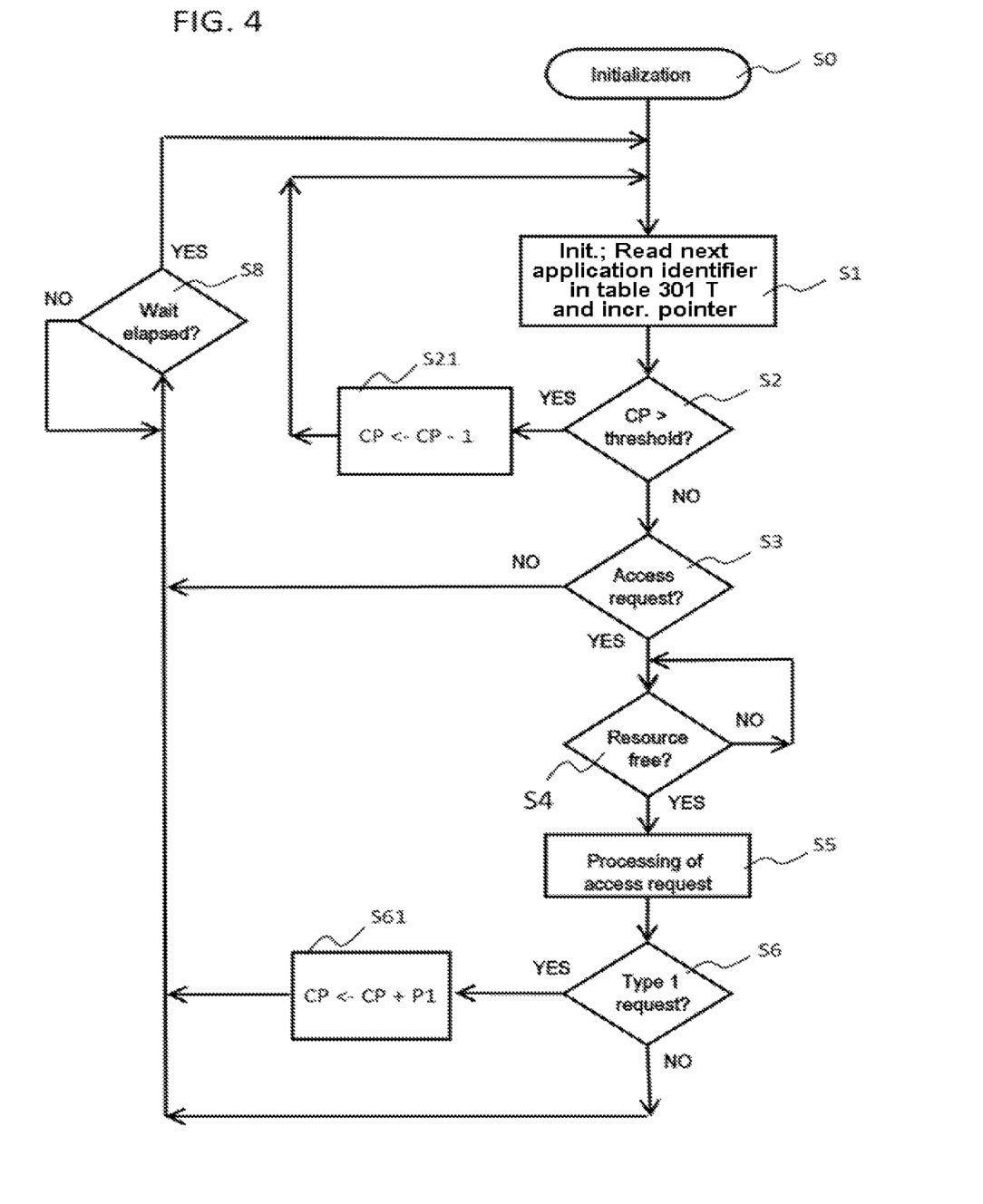
FIG. 4 is a flowchart showing the steps of a method for managing access to a shared resource, according to one particular and non-limiting embodiment of the invention.

FIG. 4 is a flowchart showing a method for managing the accesses to the non-volatile memory 120, implemented by the access manager 119, according to one embodiment of the invention. According to this embodiment, erase accesses to the memory, which are much longer than read or write accesses, are processed only at times dedicated to erasing, such as, for example, in a phase of switching the electronic system 100 off or putting it on standby, or one or more times defined according to the overall availability of the resource in question. The description illustrated by FIG. 4 thus relates only to managing read and write access to the non-volatile memory 120.

An initialization step S0 executes a complete initialization of the system 100 in which all of the circuits are initialized and at the end of which the applications A1, A2 and A3 start to be executed by the control unit 110. Throughout the remainder of the description, it should be noted that the access manager 119 performs iterative cycles of successively reading the elements of the list 301 and to this end uses indexing by virtue of an internal pointer 3200 (shown in FIG. 3). In other words, the access manager 119 uses the internal pointer 3200 to successively traverse all of the elements of the list 301 of application identifiers, then starts again at the beginning of the list when the last element of the list 301 of application identifiers has been read. The element of the list indexed at a given time by the internal pointer 3200 will be referred to as the "current element". In addition, the term "beneficiary" associated with an application qualifies, throughout the remainder of the description, the application to which the period of the calendar 201 corresponding to the current element of the list 301 of application identifiers is assigned. Thus, a "beneficiary application" is a candidate application for access to the non-volatile memory 120 that has sent a request to access the non-volatile memory 120 and that the calendar 201 specifies as eligible or not eligible for such access according to the penalty index assigned thereto.

In initialization step S0, the calendar 201, initially stored in the non-volatile memory module 113, is copied into an internal memory of the access manager 119, thus generating the list 301 of application identifiers.

A read of an element of the list 301 of application identifiers is performed, in a step S1, by the access manager 119. On each read of the current element, the internal pointer 3200 is incremented so as to traverse the list 301 of application identifiers with the iterative reads of the current element. This read is combined with initialization of a counter t of elapsed time. The counter t of elapsed time is used to guarantee that the next element to be read of the list 301 of application identifiers is not read before the end of a wait equal to the unit access time (i.e., the duration of one period of the calendar). Thus, if a candidate application eligible for access to the non-volatile memory 120 in a given period of the calendar has sent at least one access request (i.e., at least one such request pending in the corresponding queue), and its penalty index is zero, the access request is processed. However, if this candidate application for access, although being eligible (for access) since its identifier is associated with the current period of the calendar, has not sent an access request (i.e., no such request pending in the corresponding queue), then no new access request processing is initiated in the access manager 119 for a period of duration equal to one unit time (i.e., a duration of one calendar period).

In other words, the polling of the list 301 of application identifiers thus aims to identify the next application from among A1, A2 and A3 which, according to the sequence defined by the calendar 201, has sent an access request to the non-volatile memory 120 and is not or no longer assigned a penalty which was assigned thereto due to at least one previous quota exceedance.

In a step S2, the access manager 119, having identified to which candidate application the period of the calendar indicated by the internal pointer 3200 is assigned, reads the penalty index associated with the application in question, i.e., for example, the value of CPA2, and conditionally processes the access request depending on whether the penalty index exceeds the predetermined threshold mentioned above or not. According to the preferred embodiment of the invention, the predetermined threshold is set at 0, i.e., the greater the number of read cycles already performed on the entire list 301 of application identifiers, the fairer the temporal distribution of access to the non-volatile memory 120 between the different candidate applications A1, A2 and A3 tends to be. According to one variant, the predetermined threshold is higher than 0, which implies that some unfairness in the temporal distribution is accepted in the sharing of access to the non-volatile memory 120 by the different candidate applications. Depending on the context, the predetermined threshold with which one of the penalty indices CPA1, CPA2 and CPA3 is compared in step S2 may be modified dynamically to adjust the fairness constraint between the different applications.

When the penalty index of the beneficiary application is higher than the predetermined threshold, the access request potentially in the queue from the beneficiary application is not processed and the penalty index of the beneficiary application is decremented in a step S21. It is then considered whether to allow access to the non-volatile memory 120 for another application which follows it sequentially in the list 301 of application identifiers (and therefore in the calendar 201). To do this, the method returns to step S1 and a read of the next application identifier is executed, along with the subsequent steps, according to the application identifier read and its penalty index.

In the case where the penalty index of the beneficiary application is lower than or equal to the predetermined threshold, the access manager 119 polls, in step S3, the circular buffer associated with the current application (an identifier of which is indicated and read in the list of identifiers) in order to determine whether an access request has been sent by the application associated with the identifier indicated in the list. Thus, if, for example, the application identifier read in the list 301 of application identifiers represents the application A2, then the access manager 119 polls the buffer WFA2 for access requests from the application A2. If no request to access the non-volatile memory 120 is present in the circular buffer of the application (i.e., in this example, the application A2), no new request processing is initiated and the access manager 119 performs a read of the next element (application identifier) of the list 301 of application identifiers after a time equal to one unit access time has elapsed since the read previously performed in step S1. The comparison of the time counter t with the minimum waiting time value (i.e., the duration of one unit access time) is performed in a step S8.

In the case where at least one access request is detected in the circular buffer in step S3, the access manager 119 initiates processing of the access request in a step S5, after having checked, in a step S4, whether the non-volatile memory 120 is available for this. Specifically, it may be that, due to an access under way subsequent to processing initiated in a preceding read cycle, the non-volatile memory 120 is still unavailable for a new access. In this case, it moves on to step S4 of waiting for the availability of the non-volatile memory 120. It is therefore apparent that the periods of processing the elements of the list 301 of application identifiers are different from the "theoretical" periods of the calendar 201 due to the access times sometimes extending beyond the duration of one unit access time.

In a step S6, and after having initiated the processing of an access request presented by the beneficiary application, the corresponding penalty index of the beneficiary application is conditionally incremented, by the access manager 119, according to the access type requested from among the two predefined types: type 0 and type 1 (read or write). For example, if the newly processed access request requires access to the non-volatile memory 120 for a duration longer than the unit duration, the penalty index of the beneficiary application is incremented by a penalty dependent on the access type (for example, a penalty equal to one is applied in the case of a write access). In other words, for an access time equal to n units access time, the penalty is P=n−1. Stated otherwise, an application that has used n units access time to complete an access will have to "miss its turn" for the n−1 next reads of the list of identifiers 301 for which this application appears as the beneficiary, which corresponds well to the temporal distribution of the accesses to the non-volatile memory 120 according to the calendar 201. In the case where the access request is not identified as relating to an access whose duration is longer than the unit access time, it is therefore a read access request, and no penalty is to be applied.

According to one variant embodiment of the invention, the penalty coefficient potentially applied for an application being executed has a value measured during the processing of the access request. This is not, in this case, a predefined set value but the actually measured time for performing the access in question. In this case, the processing of a request initiated in step S5 initializes a time counter dedicated to measuring the access time. This time counter is then incremented so as to contain a value representative of the time elapsed from its initialization and until the completion of the access in question. This indication of time elapsed during the execution of the access is then used for the definition of the penalty coefficient to be applied.

It can be seen from the flowchart of FIG. 4 that the invention advantageously makes it possible to establish an average distribution that is fair, over time, between the applications that access the non-volatile memory 120, even though the accesses are of different types, i.e. sometimes reads and sometimes writes, and of unequal durations.

Figure 5:
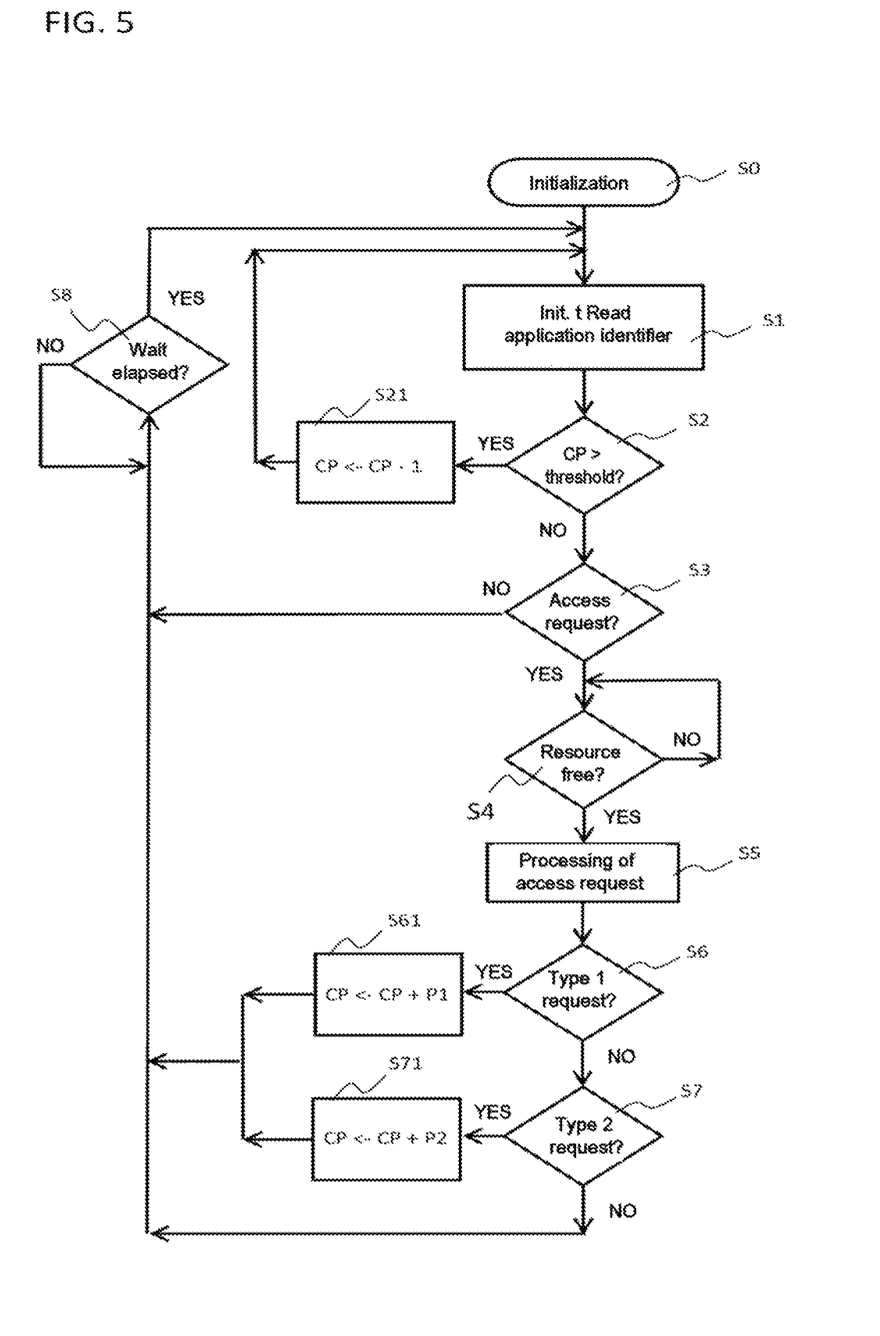
FIG. 5 is a flowchart showing one variant of the method for managing access, according to the invention, already illustrated in FIG. 4.

FIG. 5 is a flowchart showing a method for managing the accesses to the non-volatile memory 120, implemented by the access manager 119, according to a first variant of the method schematically shown in FIG. 4. According to this first variant, erase accesses to the memory, which are much longer than read or write accesses, are processed in the same cycles of iteratively reading the list 301 of application identifiers.

All of the steps of the method shown in this FIG. 5 are similar to those of the method shown in FIG. 4, except that the method comprises additional steps S7 and S71 which aim to determine whether, in the absence of write access requests, the access request to be processed corresponds to a type 2 request, i.e., in the described case, an erase request (step S7). If applicable, the penalty index of the beneficiary application is modified accordingly (step S71). The penalty coefficient applied is then equal to 4403 if the erase access time is equal to 4404 units access time. This first variant well illustrates the fact that a fair average distribution is gradually established over the cycles of reading the list 301 of application identifiers since, in the case of an erase request, the corresponding access may require a time equal to 4404 units time, while a read of the entire list 301 of application identifiers requires 100 units time when the list is sized to contain 100 elements (candidate application identifiers).

According to this variant, and as is the case for the embodiment described above for which the accesses relate only to types 0 and 1 (read and write only), the penalty coefficient potentially applied for an application being executed has a value defined according to a predefined access time, i.e., one unit time for a type 1 access (write) and 4403 units time for a type 2 access (erase), or measured during the processing of the access request (between the start of the processing of the request and the end of the access in question).

According to a second variant, the management of the accesses to the non-volatile memory 120 takes into account, for each of the reads of the list 301 of application identifiers, an indicator positioned so as to indicate that the erase access requests should be processed or, conversely, should not be processed. According to this second variant, it is thus possible to dynamically modify the execution of a cycle of reading the list 301 of application identifiers (steps S1 to S8, with the conditional integration of the execution of steps S7 and, if applicable, S71). Such a dynamic configuration may be advantageous depending on the functions implemented by the different applications. For example, when a new application is executed, and it involves strict time constraints (critical application), erase accesses are not processed; in the opposite case, if the execution of this application is suspended, erase accesses are possible.

According to this second variant, the penalty coefficient potentially applied for an application being executed has a value defined according to an access time, which is predefined or else measured during the processing of the access request, as is the case for the methods shown FIGS. 4 and 5.

According to some variants of the invention, the access manager 119 is configured to successively process requests of identical type to access the memory so as to allow accesses in bursts to the non-volatile memory 120. For example, five write requests are processed continuously so as to generate a burst of accesses to the non-volatile memory 120 corresponding to the accesses defined in the five successive requests for one and the same application and the penalty coefficient applied is therefore multiplied by five.

Figure 6:
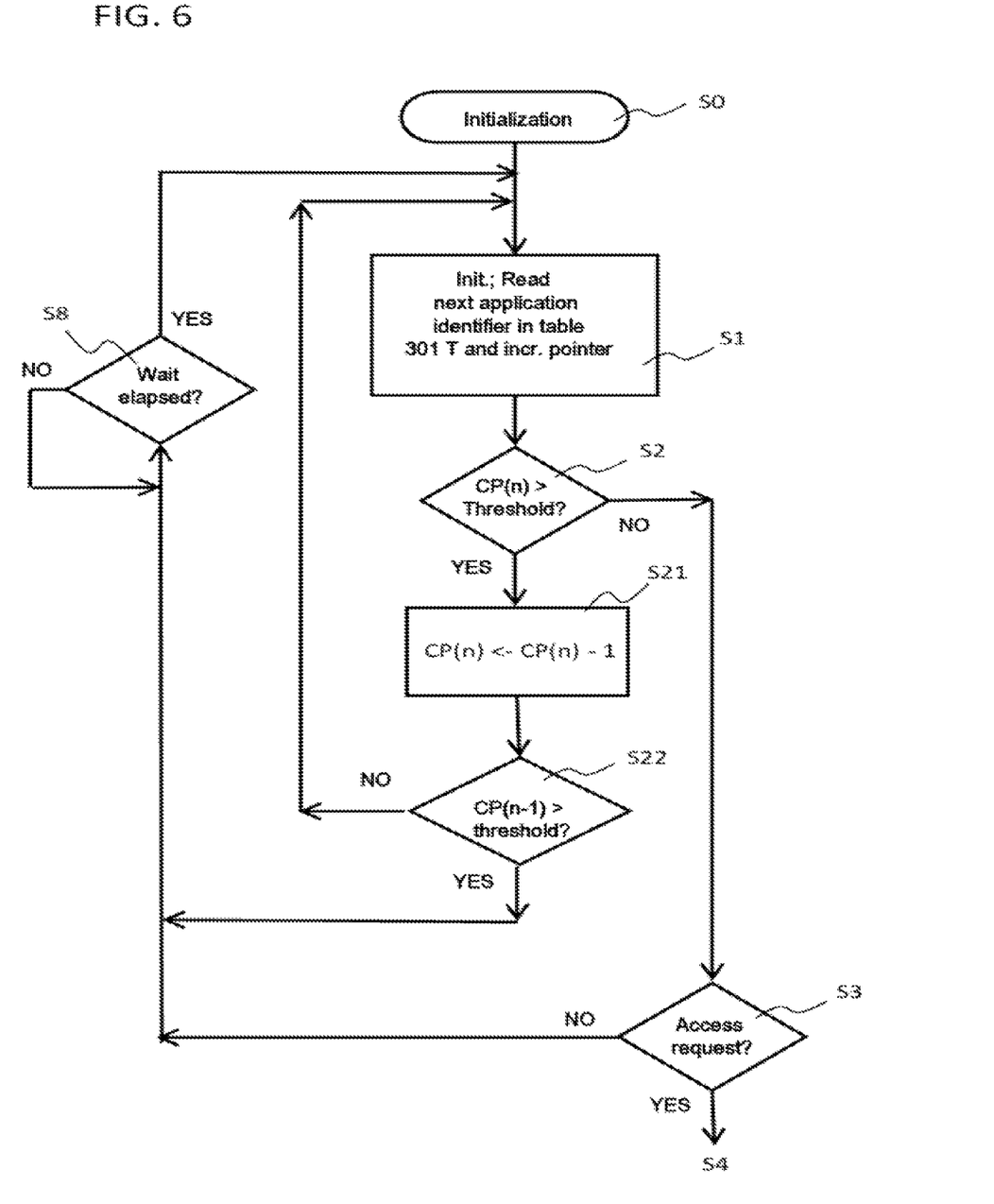
FIG. 6 is a flowchart showing one variant of the method for managing access, according to the invention, already illustrated in FIGS. 4 and 5.

FIG. 6 is a flowchart showing a method for managing the accesses to the non-volatile memory 120, implemented by the access manager 119, according to another variant. According to this variant, the implemented method comprises an additional step S22, which aims to define, in the case where the beneficiary application, identified by the current position of the internal pointer 3200 in the list 301 of application identifiers, is assigned a penalty index higher than the predetermined threshold (according to the test of step S2), and after having decremented its penalty coefficient (in step S21), whether or not it should be made to wait a unit time corresponding to a duration of one calendar period, depending on whether or not the preceding application in the sequence is already penalized.

The penalty index of the application corresponding to the indicated identifier is denoted by CP(n) in FIG. 6 and the penalty index of the previously indicated application is denoted by CP(n−1) in this same figure.

According to this variant, when, after having assigned a unit time to an application and potentially initiated the processing of a request (in the preceding iteration or "n−1" of reading an application identifier in the list 301 of application identifiers), the application indicated in the sequence (current read iteration or "n") is penalized due to one or more previous quota exceedances, it is considered whether to allow access to the non-volatile memory 120 for another application which follows it sequentially in the list 301 of application identifiers (and therefore in the calendar 201). To do this, the unit time is granted to the sequentially next application in the calendar (by connecting to step S1), but if this next application is also penalized (test of step S22), then it waits in step S8 until the end of one unit time (i.e. the duration of one period of the calendar) to initiate the processing of a subsequent access request. In other words, if, for a period in question of the calendar, the beneficiary application has no penalty, a favorable response is given to an access request from this application, as applicable. If, however, the beneficiary application has a penalty, its penalty index is decremented and the current unit time is granted to the next application in the calendar. If, for the next period, the corresponding application has no penalty, a favorable response is given to a potential access request on its part, but if, however, this application also has a penalty to discharge, it has to wait until the unit time has ended, i.e. the next period of the calendar.

Figure 7:
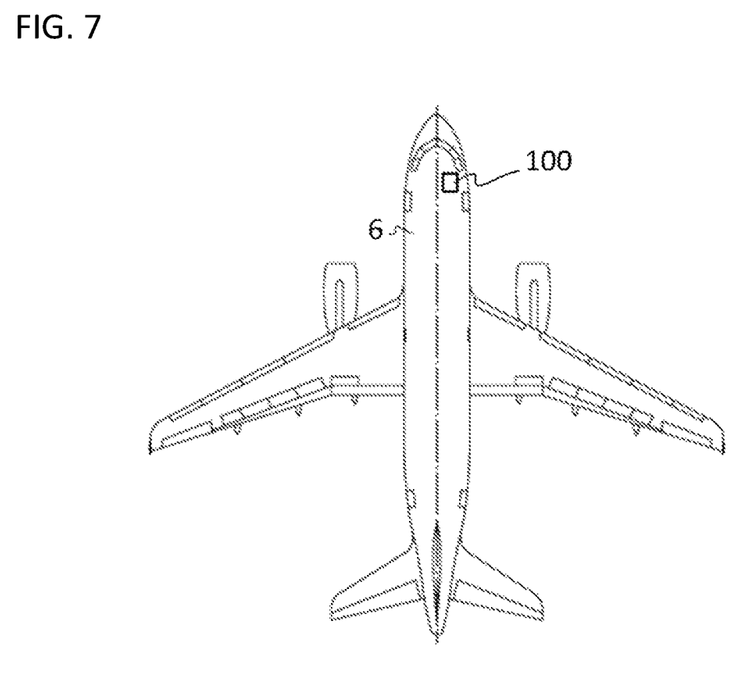
FIG. 7 shows an aircraft comprising an onboard electronic system itself comprising an access manager for managing access to a shared resource, according to one particular and non-limiting embodiment of the invention.

The method according to the invention implemented in the access manager 119 is particularly well suited when the electronic system 100 is an avionics system. Thus, FIG. 7 shows an aircraft 6 comprising the electronic system 100 configured to implement applications performing avionics functions, the spatial and temporal segregation of which is guaranteed by virtue of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing multiple accesses to a shared resource executed in an electronic system, said accesses being made by concurrent applications executed by the electronic system, the method using a calendar of periods of equal duration, each of the periods being assigned to just one of said applications so as to define a sequencing of the accesses and to assign, to each of said applications, an access quota for accessing the shared resource, the method comprising steps of:

applying a penalty to any application from among said applications whose time accessing the shared resource exceeds, for at least one calendar period assigned to said application, the access quota assigned to said application, the penalty being dependent on a duration by which a predefined unit time is exceeded, and conditionally processing requests to access the shared resource such that, when a first application may access the shared resource according to a sequence defined by the calendar, ignoring an access request transmitted by the first application if the penalty applied to the first application has not been cleared and considering authorizing access to the shared resource for a second application which follows said first application in the sequence, according to the calendar, and otherwise processing a potential pending access request for the first application if the penalty is not present or has been cleared, wherein the calendar is implemented as a list of identifiers of said applications, called candidate applications, the steps of applying a penalty and of conditionally processing the accesses comprising steps for repeatedly reading the list of identifiers of said candidate applications and, for each of the reads of an identifier of the list:

i) reading a penalty index associated with the candidate application and decrementing the associated penalty index, without processing the access request, when the penalty index read is higher than a predetermined threshold, ii) when the penalty index read is lower than or equal to the predetermined threshold, determining the presence of a potential request to access the shared resource by the candidate application corresponding to the identifier read, iii) in a presence of an access request, processing the access request and then potentially incrementing the penalty associated with the candidate application, by a coefficient indexed over a time accessing the shared resource to process said access request, and iv) waiting until a wait equal to the duration of said periods from a last read of an identifier of the list has elapsed.

2. The method according to claim 1, wherein the shared resource is a non-volatile memory.

3. The method according to claim 1, wherein each of the access requests relates to a type of access request from among two predefined types, which are read and write.

4. The method for managing access to a shared resource according to claim 3, wherein the coefficient used to increment the penalty index is a value predefined according to the type of the access request.

5. The method according to claim 1, wherein each of the access requests relates to a type of access request from among three predefined types, which are read, write and erase.

6. The method for managing access to a shared resource according to claim 5, wherein the coefficient used to increment the penalty index is a value predefined according to the type of the access request.

7. The method for managing access to a shared resource according to claim 1, wherein the coefficient used to increment the penalty index is a value corresponding to an access time measured during the processing of the request to access the shared resource.

8. An access manager device for managing multiple accesses to a shared resource in an electronic system, said accesses being made by concurrent applications executed by the electronic system, the device implementing a calendar of periods of equal duration, each of the periods being assigned to just one of said applications so as to define a sequencing of the accesses and to assign, to each of said applications, an access quota for accessing the shared resource, the device comprising electronic circuitry configured to:

apply a penalty to any application from among said applications whose time accessing the shared resource exceeds, for at least one calendar period assigned to said application, a quota assigned to said application, the penalty being dependent on a duration by which a predefined unit time is exceeded, and conditionally process requests to access the shared resource such that, when a first application may access the shared resource according to the sequence defined by the calendar, ignore an access request transmitted by the first application if a penalty applied to the first application has not been cleared and considering authorizing access to the shared resource for a second application which follows said first application in the sequence, according to the calendar, and otherwise process a potential pending access request for the first application if the penalty is not present or has been cleared, wherein the calendar is implemented as a list of identifiers of said applications, called candidate applications, and wherein the electronic circuitry is further configured to repeatedly read the list of identifiers of said candidate applications and, for each of the reads of an identifier of the list:

i) read a penalty index associated with the candidate application and decrementing the associated penalty index, without processing the access request, when the penalty index read is higher than a predetermined threshold, ii) when the penalty index read is lower than or equal to the predetermined threshold, determine the presence of a potential request to access the shared resource by the candidate application corresponding to the identifier read, iii) in a presence of an access request, process the access request and then potentially incrementing the penalty associated with the candidate application, by a coefficient indexed over a time accessing the shared resource to process said access request, and iv) wait until a wait equal to the duration of said periods from a last read of an identifier of the list has elapsed.

9. An electronic system comprising:
a shared resource, and
an access manager device to manage multiple accesses to the shared resource, the multiple accesses being made by concurrent applications executed by the electronic system, the access manager device implementing a calendar of periods of equal duration, each of the periods being assigned to just one of said applications so as to define a sequencing of the accesses and to assign, to each of said applications, an access quota for accessing the shared resource, the access manager device comprising electronic circuitry configured to:
apply a penalty to any application from among said applications whose time accessing the shared resource exceeds, for at least one calendar period assigned to said application, a quota assigned to said application, the penalty being dependent on a duration by which a predefined unit time is exceeded, and conditionally process requests to access the shared resource such that, when a first application may access the shared resource according to the sequence defined by the calendar, ignore an access request transmitted by the first application if a penalty applied to the first application has not been cleared and considering authorizing access to the shared resource for a second application which follows said first application in the sequence, according to the calendar, and otherwise process a potential pending access request for the first application if the penalty is not present or has been cleared, wherein the calendar is implemented as a list of identifiers of said applications, called candidate applications, and wherein the electronic circuitry is further configured to repeatedly read the list of identifiers of said candidate applications and, for each of the reads of an identifier of the list:

i) read a penalty index associated with the candidate application and decrementing the associated penalty index, without processing the access request, when the penalty index read is higher than a predetermined threshold, ii) when the penalty index read is lower than or equal to the predetermined threshold, determine the presence of a potential request to access the shared resource by the candidate application corresponding to the identifier read, iii) in a presence of an access request, process the access request and then potentially incrementing the penalty associated with the candidate application, by a coefficient indexed over a time accessing the shared resource to process said access request, and iv) wait until a wait equal to the duration of said periods from a last read of an identifier of the list has elapsed.

10. The electronic system according to claim 9, wherein the electronic system is further configured to implement avionics functions.

11. An aircraft comprising the electronic system according to claim 9.

* * * * *